US011022242B2

(12) United States Patent
Nakata et al.

(10) Patent No.: US 11,022,242 B2
(45) Date of Patent: Jun. 1, 2021

(54) PIPE CONNECTION STRUCTURE, PIPE CONNECTION UNIT, AND CONNECTION METHOD OF PIPE

(71) Applicant: FUJIKIN INCORPORATED, Osaka (JP)

(72) Inventors: Tomohiro Nakata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 360 days.

(21) Appl. No.: 15/767,327

(22) PCT Filed: Oct. 26, 2016

(86) PCT No.: PCT/JP2016/081687
§ 371 (c)(1),
(2) Date: Apr. 10, 2018

(87) PCT Pub. No.: WO2017/073596
PCT Pub. Date: May 4, 2017

(65) Prior Publication Data
US 2018/0299045 A1    Oct. 18, 2018

(30) Foreign Application Priority Data

Oct. 30, 2015   (JP) .............................. JP2015-214936

(51) Int. Cl.
*F16L 19/10*       (2006.01)
*F16L 55/027*     (2006.01)

(52) U.S. Cl.
CPC ........... *F16L 19/103* (2013.01); *F16L 55/027* (2013.01)

(58) Field of Classification Search
CPC ......... F16L 19/08; F16L 19/061; F16L 19/06; F16L 19/07; F16L 55/027; F16L 55/02709
(Continued)

(56) References Cited

U.S. PATENT DOCUMENTS 2,333,612 A * 11/1943 Zimmer ................ F16L 33/224
                                                          285/249
2,394,351 A *  2/1946 Wurzburger ............ F16L 19/12
                                                          285/341
(Continued)

FOREIGN PATENT DOCUMENTS

JP        S63-37896 U      3/1988
JP        H01-169697 U    11/1989
(Continued)

OTHER PUBLICATIONS

Mar. 2019 Office Action issued in Chinese Patent Application No. 201680062176.7.
(Continued)

*Primary Examiner* — David Bochna
(74) *Attorney, Agent, or Firm* — Oliff PLC

(57) ABSTRACT

A first ring and a second ring are inserted through the pipe. The pipe is inserted through a fastening member, and a tip of the pipe is inserted into a first concave part of the joint. By screwing a screw part of the fastening member to a screw part of the joint, the first ring and the second ring are pressed against the first contact surface provided to the first concave part, and bite into the pipe to fix the pipe. Further, the pipe fixed by the first ring and the second ring is moved to a joint side by a pressing force to press an orifice plate installed in the joint. Consequently, it is possible to maintain sealability of a flow path in the joint at a plurality of places including a place of the orifice plate.

12 Claims, 4 Drawing Sheets

(58) Field of Classification Search
USPC .................................................. 138/40, 44
See application file for complete search history.

(56) References Cited

U.S. PATENT DOCUMENTS

| | | | | | |
|---|---|---|---|---|---|
| 3,103,373 | A | * | 9/1963 | Lennon | F16L 19/103 285/342 |
| 3,311,131 | A | * | 3/1967 | Zahuranec | F16L 55/027 138/44 |
| 3,332,708 | A | * | 7/1967 | Jackson | F16L 19/10 285/3 |
| 4,008,911 | A | * | 2/1977 | Kiyooka | F16L 47/04 285/249 |
| 4,076,286 | A | * | 2/1978 | Spontelli | F16L 19/103 285/341 |
| 5,217,261 | A | * | 6/1993 | DeWitt | F16L 19/065 285/332.2 |
| 5,954,375 | A | * | 9/1999 | Trickle | F16L 19/065 285/342 |
| 6,438,814 | B1 | * | 8/2002 | Seymour | F16L 19/061 285/249 |
| 7,100,949 | B2 | * | 9/2006 | Williams | F16L 19/10 285/342 |
| 7,461,636 | B2 | * | 12/2008 | Ricco | F02M 55/005 123/456 |
| 7,726,700 | B2 | * | 6/2010 | Norman | F16L 19/083 285/322 |
| 8,439,404 | B2 | * | 5/2013 | Anton | F16L 19/061 285/93 |
| 9,010,766 | B2 | * | 4/2015 | Rubin | F16L 57/005 277/602 |
| 2004/0094127 | A1 | * | 5/2004 | Watanabe | F02M 55/005 123/447 |
| 2004/0195837 | A1 | * | 10/2004 | Kondo | F16L 41/086 285/354 |
| 2005/0242582 | A1 | * | 11/2005 | Williams | F16L 19/061 285/332.1 |
| 2006/0091672 | A1 | * | 5/2006 | Matsuhashi | F16L 19/061 285/6 |
| 2006/0138774 | A1 | * | 6/2006 | Williams | F16L 19/061 285/339 |
| 2013/0043677 | A1 | * | 2/2013 | Gibson | F16L 19/061 285/331 |
| 2015/0145249 | A1 | * | 5/2015 | Taneya | F16L 37/091 285/340 |
| 2017/0037987 | A1 | * | 2/2017 | Dohi | F16L 15/008 |
| 2019/0203686 | A1 | * | 7/2019 | Suzuki | F02M 55/02 |
| 2020/0025643 | A1 | * | 1/2020 | Yokoi | G01N 33/0004 |

FOREIGN PATENT DOCUMENTS

| | | |
|---|---|---|
| JP | H08-014449 A | 1/1996 |
| JP | 2920331 B2 | 7/1999 |
| JP | 2004-044633 A | 2/2004 |
| JP | 2015-125061 A | 7/2015 |
| KR | 10-2005-0016996 A | 2/2005 |

OTHER PUBLICATIONS

Dec. 20, 2016 Search Report issued in International Patent Application No. PCT/JP2016/081687.
May 1, 2018 International Preliminary Report on Patentability issued in International Patent Application No. PCT/JP2016/081687.
Feb. 24, 2020 Office Action issued in Korean Patent Application No. 10-2018-7015137.
Aug. 5, 2019 Office Action issued in Korean Patent Application No. 10-2018-7015137.

* cited by examiner

PIPE CONNECTION STRUCTURE, PIPE CONNECTION UNIT, AND CONNECTION METHOD OF PIPE

CROSS REFERENCE TO RELATED APPLICATION

This application is a U.S. National Stage application claiming the benefit of prior filed International Application Number PCT/JP2016/081687, filed on Oct. 26, 2016, in which the International Application claims priority from Japanese Patent Application Number 2015-214936, filed on Oct. 30, 2015, the entire contents of which are incorporated herein by reference.

TECHNICAL FIELD

The present invention relates to a pipe connection structure, a pipe connection unit, and a connection method of a pipe for connecting a pipe to a pipe joint, a joint of a valve, or the like.

BACKGROUND ART

In a semiconductor manufacturing process of manufacturing a semiconductor device, there are used, for example, a multi-chamber type semiconductor manufacturing equipment in which a plurality of wafers are processed in parallel by a plurality of processing chambers, or a multi-process type semiconductor manufacturing equipment in which a plurality of processes are executed by one processing chamber. In a semiconductor manufacturing equipment, a reaction active gas is supplied from a fluid control unit to a processing chamber and the like, to thereby carry out a film formation process or an etching process.

In a fluid control unit which is mounted on a semiconductor manufacturing equipment, for example, an air operation valve, a flow control valve, and an equipment such as a mass flow controller are connected to a base block by using pipes, pipe joints, and the like, thereby forming a plurality of flow paths. For example, an integrated-type fluid control unit having a plurality of flow paths is mounted on a semiconductor manufacturing equipment which performs a semiconductor manufacturing process. Further, in a fluid control unit, an orifice plate having an orifice (opening) is sometimes provided in a flow path of the fluid control unit so that gas with high pressure and large flow rate supplied from a supplying source such as a cylinder is throttled to an appropriate flow rate and then supplied to a fluid control equipment including a flow control valve and the like.

For example, an opening diameter of an orifice is set so that a relationship between a pressure $P_1$ of gas on an upstream side of the orifice and a pressure $P_2$ of gas on a downstream side of the orifice satisfies a critical expansion condition ($P_1 \geq 2P_2$). When the relationship between the pressure $P_1$ of the gas on the upstream side of the orifice and the pressure $P_2$ of the gas on the downstream side of the orifice satisfies the critical expansion condition, even if the pressure $P_1$ of the gas on the upstream side of the orifice is changed greatly, a current velocity of the gas on the downstream side of the orifice is kept constant. Therefore, when the orifice plate is provided in the flow path of the fluid control unit, it is possible to supply the gas with stabilized current velocity to the fluid control equipment, and it is possible to prevent regurgitation of the gas caused by a pressure difference between positions in front of and behind the orifice. Further, the flow rate of the gas to be supplied to the fluid control equipment is suppressed by the orifice plate provided in the flow path, so that by performing fine adjustment of the supply amount of the gas to be used in a processing chamber and the like in a semiconductor manufacturing equipment, the fluid control equipment can supply a predetermined amount of gas to the processing chamber and the like. As a result of this, it is possible to suppress a burden imposed on a flow control of the fluid control equipment.

Incidentally, an orifice plate is installed inside a pipe joint or the like, or it is welded to a tip of a pipe to be connected to a pipe joint or the like. When the orifice plate is installed inside the joint, a male screw formed on an outer periphery of the orifice plate is screwed to a female screw formed on a flow path of the joint, or the orifice plate disposed inside the joint is fixed to the joint together with a pipe.

Meanwhile, a reaction active gas which flows through the flow path of the fluid control unit sometimes has toxicity and corrosiveness, and sometimes has a pyrophoric property causing ignition in the air. For this reason, a pipe joint or the like which connects a pipe is required to have a structure with sealability with which gas flowing through the flow path is not leaked to the outside. Also when liquid flows through the flow path of the fluid control unit, it is required to provide a structure with sealability with which the liquid flowing through the flow path is not leaked to the outside.

For example, when an orifice plate is welded to a tip of a pipe to be connected to a joint, by welding the pipe inserted from an opening of the joint to the opening, sealability is maintained (Patent Document 2). When an orifice plate is screwed to a joint, a ring-shaped sleeve is fitted onto a pipe to be inserted through a nut member, the pipe is then inserted into a joint to which the orifice plate is screwed, the nut member is screwed to the joint, and the sleeve is brought into contact with an inner wall of the joint and the pipe in a pressing state, thereby maintaining the sealability (Patent Document 1). When an orifice plate disposed in a joint is fixed to the joint together with a pipe, a screw part provided to the pipe is screwed to a screw part provided to the joint, and a gasket and the orifice plate are pressed against the joint by a tip of the pipe inserted into the joint, thereby maintaining the sealability (Patent Document 3).

Patent Document 1: Japanese Unexamined Utility Model Application Publication No. H01-169697
Patent Document 2: Japanese Unexamined Utility Model Application Publication No. S63-37896
Patent Document 3: Japanese Unexamined Patent Application Publication No. 2015-125061
Patent Document 4: Japanese Unexamined Patent Application Publication No. 2004-44633

DISCLOSURE

Problems to be Solved

When the sealability of the joint is maintained by the welding of the joint and the pipe as in Patent Document 2, or when the sealability of the joint is maintained by the ring-shaped sleeve as in Patent Document 1, a part of the fluid which flows through the pipe and the flow path of the joint enters the outer periphery of the pipe from the tip of the pipe inserted into the joint. When the fluid is gas possessing corrosiveness, the outer periphery of the pipe, the sleeve and the like may be contaminated by the gas. Alternatively, when moisture contained in the gas is condensed at the outer periphery, the outer periphery of the pipe, the sleeve and the like may be corroded. Also when the fluid is liquid, there is a possibility that the outer periphery of the pipe, the sleeve and the like are corroded.

Besides, sealability when connecting a pipe to a joint has been conventionally maintained at one place by using a welded part, a sleeve, a gasket, or the like. However, in order to improve reliability of the sealability, it is desirable to seal the joint and the pipe at, not only one place, but a plurality of places.

One proposition of the present invention is to maintain, when connecting a pipe to a joint to which an orifice plate is disposed, sealability of a flow path in the joint at a plurality of places including a place of the orifice plate.

Means for Solving the Problems

In order to solve the above-described problems, in one aspect of the present invention, a pipe connection structure is characterized in that it includes a joint having a first through hole through which fluid flows, a first concave part communicated with the first through hole and into which a pipe is inserted, a first contact surface provided to an open end of the first concave part, and an installation surface provided to the first concave part at an open end of the first through hole and to which an orifice plate is installed; a first ring through which the pipe is inserted and which is brought into contact with the first contact surface; a second ring through which the pipe is inserted; and a fastening member having a second through hole through which the pipe is inserted, a second concave part communicated with the second through hole, a second contact surface provided to the second concave part at an open end of the second through hole and with which the second ring is brought into contact, and a screw part which is screwed to a screw part provided to the joint, by screwing of the screw parts, pressing the first ring and the second ring held between the first contact surface and the second contact surface against the first contact surface to make the first ring and the second ring bite into the pipe to fix the first ring and the second ring to the pipe, and making the pipe fixed by the first ring and the second ring move to a joint side by a pressing force to press the orifice plate installed to the installation surface against the installation surface side with a tip of the pipe, in which a hardness of the first ring is higher than a hardness of the pipe and equal to or less than a hardness of the joint, and a hardness of the second ring is higher than the hardness of the joint.

A Vickers hardness of the second ring is preferably set between 700 and 900, a Vickers hardness of the first ring is preferably set between 250 and 350, a Vickers hardness of the joint is preferably set between 250 and 400 and equal to or greater than the Vickers hardness of the first ring, and a Vickers hardness of the pipe is preferably set between 150 and 250 and lower than the Vickers hardness of the first ring.

A hardness of the orifice plate is preferably lower than the hardness of the pipe.

A Vickers hardness of the orifice plate is preferably set between 80 and 200 and lower than the hardness of the pipe.

It is preferable that in the second ring, a region including a contact part which is brought into contact with the first ring when the fastening member is screwed to the joint, includes a hardened part hardened by a carburizing treatment.

It is preferable that the first contact surface of the joint includes a smooth part smoothed by a burnishing machining, and a hardness of the smooth part is higher than the hardness of the first ring.

In another aspect of the present invention, a pipe connection unit which connects a pipe to a joint having a first through hole through which fluid flows, a first concave part communicated with the first through hole and into which the pipe is inserted, a first contact surface provided to an open end of the first concave part, and an installation surface provided to the first concave part at an open end of the first through hole and to which an orifice plate is installed, the pipe connection unit is characterized in that it includes a first ring through which the pipe is inserted and which is brought into contact with the first contact surface; a second ring through which the pipe is inserted; and a fastening member having a second through hole through which the pipe is inserted, a second concave part communicated with the second through hole, a second contact surface provided to the second concave part at an open end of the second through hole and with which the second ring is brought into contact, and a screw part which is screwed to a screw part provided to the joint, by screwing of the screw parts, pressing the first ring and the second ring held between the first contact surface and the second contact surface against the first contact surface to make the first ring and the second ring bite into the pipe to fix the first ring and the second ring to the pipe, and making the pipe fixed by the first ring and the second ring move to a joint side by a pressing force to press the orifice plate installed to the installation surface against the installation surface side with a tip of the pipe, in which a hardness of the first ring is higher than a hardness of the pipe and equal to or less than a hardness of the joint, and a hardness of the second ring is higher than the hardness of the joint.

In still another aspect of the present invention, a connection method of a pipe in which the pipe is installed, together with an orifice plate, to a joint having a first through hole through which fluid flows, a first concave part communicated with the first through hole and having a first contact surface provided to an open end of the first concave part, and a screw part, by using a pipe connection unit including a first ring whose hardness is higher than a hardness of the pipe and equal to or less than a hardness of the joint; a second ring whose hardness is higher than the hardness of the joint; and a fastening member having a second through hole through which the pipe is inserted, a second concave part communicated with the second through hole, a second contact surface provided to the second concave part at an open end of the second through hole and with which the second ring is brought into contact, and a screw part, the connection method of the pipe is characterized in that it includes disposing the orifice plate to an installation surface provided to the first concave part at an open end of the first through hole; inserting a tip of the pipe inserted through the fastening member, the second ring, and the first ring into the first concave part; by screwing the screw part of the fastening member to the screw part of the joint, pressing the first ring and the second ring held between the first contact surface and the second contact surface against the first contact surface; and making the first ring and the second ring bite into the pipe to fix the first ring and the second ring to the pipe, and making the pipe fixed by the first ring and the second ring move to a joint side by a pressing force to press the orifice plate disposed to the installation surface against the installation surface side with the tip of the pipe.

Further, it is also possible that, before installing the pipe to the joint, the fastening member screwed to the joint is loosened, the fastening member is detached from the joint together with the pipe which is in use and into which the first ring and the second ring are bitten, and the orifice plate which is in use is detached from the first concave part.

According to the present invention, by screwing the fastening member to the joint, it is possible to press the first ring against the first contact surface of the joint, and to press the orifice plate against the joint with the tip of the pipe fixed by the first ring and the second ring. As a result of this, when connecting the pipe to the joint to which the orifice plate is disposed, it is possible to maintain sealability of a flow path in the joint, at a plurality of places including a place of the orifice plate.

DETAILED DESCRIPTION OF THE EMBODIMENTS

Hereinafter, embodiments of a pipe connection structure, a pipe connection unit, and a connection method of a pipe according to the present invention will be described. The pipe connection structure, the pipe connection unit, and the connection method of the pipe of the present invention are applied to a fluid control unit 100 which controls gas to be supplied to a semiconductor manufacturing equipment or the like, as an example. Note that the pipe connection structure of the present invention may also be applied to a fluid control unit which controls liquid to be supplied to a semiconductor manufacturing equipment or the like.

Figure 1:
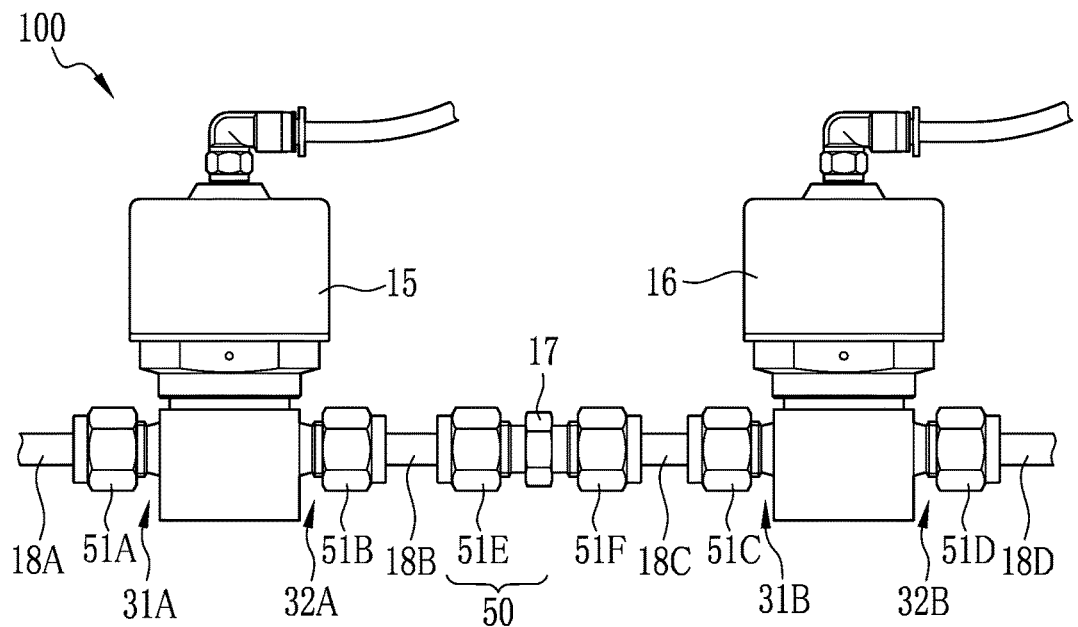
FIG. 1 is a view illustrating an example in which two air operation valves which form a fluid control unit are mutually connected by pipes and a pipe joint.

FIG. 1 illustrates an example in which two air operation valves 15, 16 that form the fluid control unit 100 are mutually connected by pipes 18B, 18C, and a pipe joint 17. The air operation valve 15 has a joint part 31A to which a pipe 18A is connected by a fastening member 51A, and a joint part 32A to which the pipe 18B is connected by a fastening member 51B. The air operation valve 16 has a joint part 31B to which the pipe 18C is connected by a fastening member 51C, and a joint part 32B to which a pipe 18D is connected by a fastening member 51D. Each of the pipe joint 17 and the joint parts 31A, 31B, 32A, 32B is an example of a joint. The pipe 18B is connected to the pipe joint 17 by a fastening member 51E, and the pipe 18C is connected to the pipe joint 17 by a fastening member 51F. That is, the two air operation valves 15, 16 are mutually connected by the two pipes 18B, 18C connected via the pipe joint 17. For example, each of the pipes 18A, 18B, 18C, 18D is cylindrical, and is formed by using a metal material such as stainless steel (SUS). A Vickers hardness of each of the pipes 18A, 18B, 18C, 18D is set to 200, for example. Note that it is preferable that the Vickers hardness of each of the pipes 18A, 18B, 18C, 18D is set to one between 150 and 250 and lower than a Vickers hardness of a front ring 52.

In the fluid control unit 100 illustrated in FIG. 1, gas supplied from the pipe 18A passes through the air operation valve 15, the pipe 18B, the pipe joint 17, the pipe 18C, and the air operation valve 16 to be output from the pipe 18D, and supplied to a fluid control equipment. The pipe 18B and the pipe joint 17 are connected by a pipe connection unit 50 including the fastening member 51E (details will be illustrated in FIG. 4 and FIG. 5). Although FIG. 1 illustrates the example in which the two air operation valves 15, 16 are mutually connected, the pipe connection structure, the pipe connection unit, and the connection method of the pipe of the present invention can be applied to a connection of two valves of mutually different types or a connection between a valve and a fluid control equipment.

Figure 2:
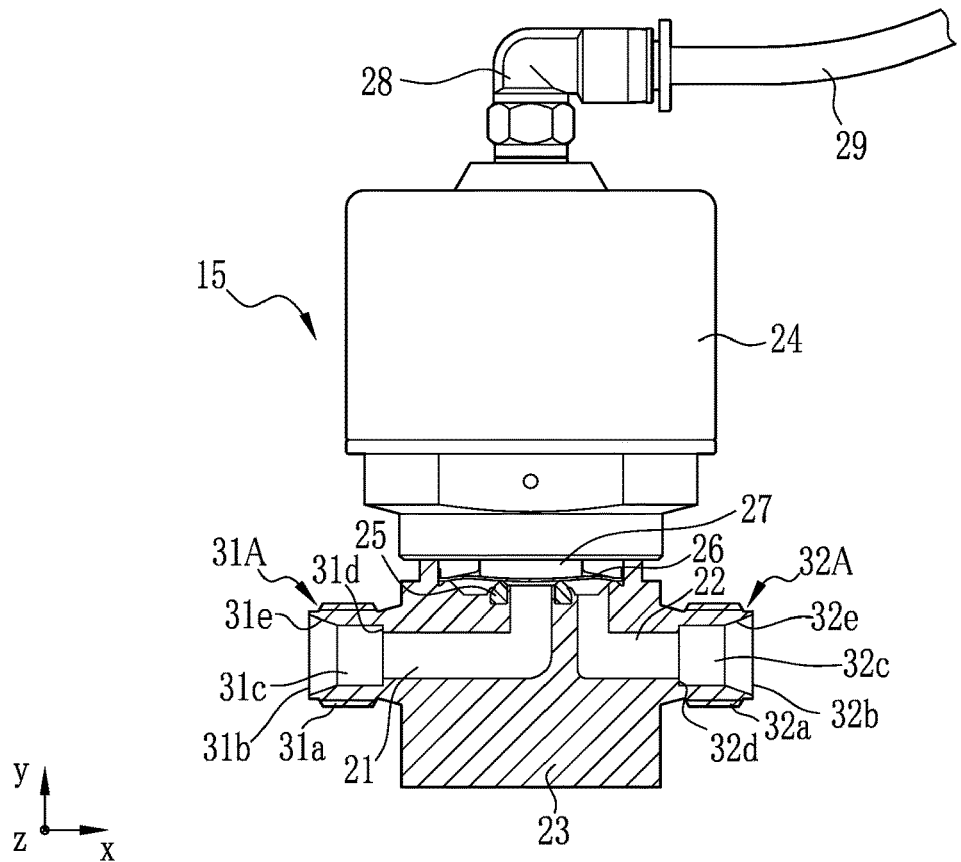
FIG. 2 is a partial sectional view of the air operation valve illustrated in FIG. 1.

FIG. 2 illustrates an example of the air operation valve 15 illustrated in FIG. 1. The air operation valves 15, 16 have mutually the same configuration, so that in FIG. 2, the configuration of the air operation valve 15 is explained, and the explanation of the configuration of the air operation valve 16 is omitted. The air operation valve 16 is explained by replacing a reference numeral 15 with a reference numeral 16, replacing a reference numeral 31A with a reference numeral 31B, and replacing a reference numeral 32A with a reference numeral 32B in FIG. 2. Note that in FIG. 2, a valve body 23 in the air operation valve 15 is illustrated by a cross section.

The air operation valve 15 illustrated in FIG. 2 is a valve which opens/closes a flow path being a passage through which fluid flows, by driving a piston (whose illustration is omitted) provided inside a casing 24, by supplying or stopping a driving air from a tube 29. The air operation valve 15 has the valve body 23 having a passage 21 into which fluid flows and a passage 22 from which fluid flows out, and the casing 24 provided above the valve body 23. Here, a shape of a cross section orthogonal to an axial direction of each of the passages 21, 22 is a circular shape, for example. The air operation valve 15 has an annular valve seat 25 disposed at a connection portion between the valve body 23 and the casing 24, a diaphragm (valve element) 26, and a diaphragm presser 27. The annular valve seat 25 is provided in a periphery of an end of the passage 21 on the casing 24 side. In accordance with a movement of the piston provided inside the casing 24, the diaphragm 26 opens the flow path when it is separated from the annular valve seat 25 together with the diaphragm presser 27, and it closes the flow path when it is pressed against the annular valve seat 25 by the diaphragm presser 27. To the casing 24, on a side opposite to the connection portion with the valve body 23, the tube 29 for introducing the driving air into the casing 24 is connected via a one-touch joint 28.

The valve body 23 is formed by using a metal material such as stainless steel, for example. The valve body 23 has cylindrical joint parts 31A, 32A protruding toward both ends in an x direction illustrated in FIG. 2. The joint part 31A has a male screw part 31$a$, a tapered part 31$e$, and an insertion part 31$c$. The male screw part 31$a$ is provided on an outer periphery of the joint part 31A. The tapered part 31$e$ has a tapered surface in which an inner diameter is gradually reduced from an open end 31$b$ toward the inside of the joint part 31A. On one end of the tapered part 31$e$, the open end 31$b$ is formed, and on the other end of the tapered part 31$e$, the insertion part 31$c$ is formed. A cross section in a yz plane of the insertion part 31$c$ has a circular shape.

An axis of the tapered part 31e, an axis of the insertion part 31c, and an axis of the passage 21 coincide with one another. An inner diameter of the insertion part 31c is larger than an inner diameter of the passage 21, and is slightly larger than an outer diameter of the pipe 18A (FIG. 1) which is inserted into the insertion part 31c. Therefore, to a portion where the insertion part 31c and the passage 21 are communicated, there is provided a step surface 31d which regulates a movement of the pipe 18A when a tip of the pipe 18A is brought into contact therewith. Further, the inner diameter of the insertion part 31c and an inner diameter of an end on the insertion part 31c side of the tapered part 31e coincide with each other.

The joint part 32A has a male screw part 32a, a tapered part 32e, and an insertion part 32c, similarly to the joint part 31A. The tapered part 32e has a tapered surface in which an inner diameter is gradually reduced from an open end 32b toward the inside of the joint part 32A. A taper angle of the tapered part 32e is set to be the same as a taper angle of the tapered part 31e. Here, the taper angle is an angle made by two generating lines which face each other with a central axis interposed therebetween, and it is, for example, an angle made by two straight lines that appear on an upper side and a lower side in a cross section of the tapered part 31e illustrated in FIG. 2 in which a point at which the two straight lines intersect when they are extended, is set to a vertex. On one end of the tapered part 32e, the open end 32b is formed, and on the other end of the tapered part 32e, the insertion part 32c is formed. A cross section in a yz plane of the insertion part 32c has a circular shape.

An axis of the tapered part 32e, an axis of the insertion part 32c, and an axis of the passage 22 coincide with one another. An inner diameter of the insertion part 32c is larger than an inner diameter of the passage 22, and is slightly larger than an outer diameter of the pipe 18B (FIG. 1) which is inserted into the insertion part 32c. Therefore, to a portion where the insertion part 32c and the passage 22 are communicated, there is provided a step surface 32d which regulates a movement of the pipe 18B when a tip of the pipe 18B is brought into contact therewith. Further, the inner diameter of the insertion part 32c and an inner diameter of an end on the insertion part 32c side of the tapered part 32e coincide with each other.

Figure 3A:
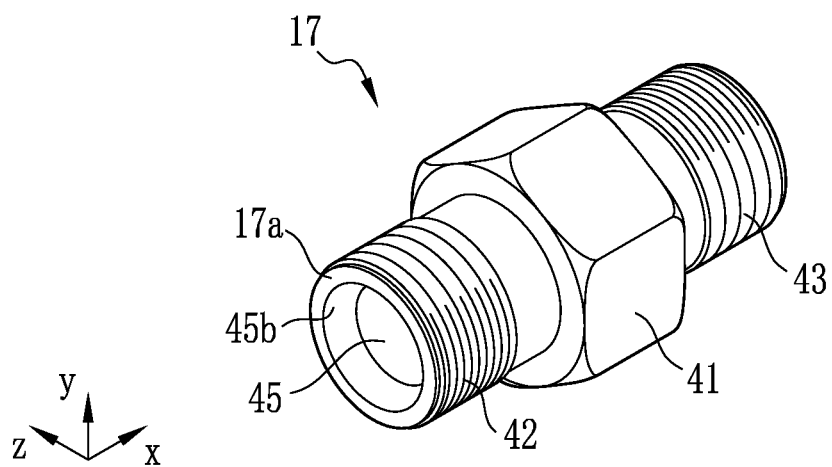
FIG. 3A is a perspective view of the pipe joint illustrated in FIG. 1.
Figure 3B:
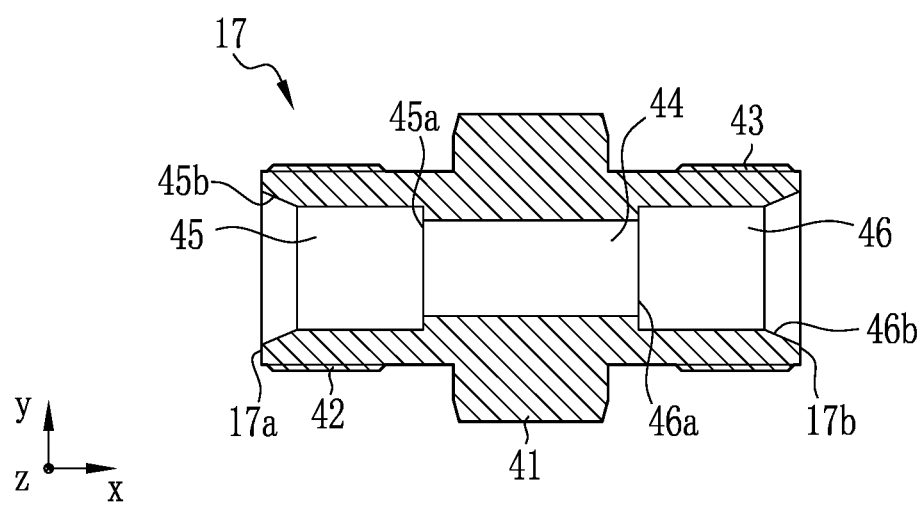
FIG. 3B is a sectional view in an xy plane of the pipe joint illustrated in FIG. 3A.

Each of FIG. 3A and FIG. 3B illustrates an example of the pipe joint 17 illustrated in FIG. 1. As illustrated in FIG. 3A and FIG. 3B, the pipe joint 17 being one embodiment of the joint is substantially cylindrical, and has a nut part 41, male screw parts 42, 43, a flow path 44, and insertion parts 45, 46. The pipe joint 17 is formed by using a metal material such as stainless steel, for example. The flow path 44 is one example of a first through hole, and the insertion part 45 is one example of a first concave part. The nut part 41 is provided on an outer peripheral surface of the pipe joint 17 and at a center portion in an axial direction of the pipe joint 17 (in an x direction illustrated in FIG. 3A), and a cross section of an outer periphery thereof has a hexagonal shape, for example. The male screw parts 42, 43 are respectively provided on an outer peripheral surface of the pipe joint 17 and on both end sides in the axial direction of the pipe joint 17. The insertion part 45 is provided on one end side in the axial direction of the pipe joint 17, and into which a tip of the pipe 18B (FIG. 1) is inserted. The insertion part 46 is provided on the other end side in the axial direction of the pipe joint 17, and a tip of the pipe 18C (FIG. 1) is inserted therein.

The flow path 44 is communicated with the insertion parts 45, 46, and a cross section thereof orthogonal to the axial direction of the pipe joint 17 has a circular shape. An axis of the flow path 44 and axes of the insertion parts 45, 46 coincide with one another. An inner diameter of the insertion part 45 is slightly larger than an outer diameter of each of the pipes 18B, 18C, and at a portion where the insertion part 45 and the flow path 44 are communicated, a step surface 45a is provided. The step surface 45a is one example of an installation surface. An inner diameter of the insertion part 46 is slightly larger than the outer diameter of the pipe 18C, and at a portion where the insertion part 46 and the flow path 44 are communicated, a step surface 46a is provided.

To an end of the insertion part 45 on the opposite side to the flow path 44, there is provided a tapered part 45b. The tapered part 45b has a tapered surface in which an inner diameter is gradually reduced from an end face 17a of the pipe joint 17 toward the flow path 44. In a similar manner, to an end of the insertion part 46 on the opposite side to the flow path 44, there is provided a tapered part 46b. The tapered part 46b has a tapered surface in which an inner diameter is gradually reduced from an end face 17b of the pipe joint 17 toward the flow path 44. A tapered surface of the tapered part 45b is one example of a first contact surface.

An inner diameter of an end of the tapered part 45b on the flow path 44 side coincides with an inner diameter of the insertion part 45, and an inner diameter of an end of the tapered part 46b on the flow path 44 side coincides with an inner diameter of the insertion part 46. A taper angle of the tapered part 45b and a taper angle of the tapered part 46b are mutually the same, and further, the taper angles of the tapered parts 45b, 46b are the same as the taper angles of the tapered parts 31e, 32e illustrated in FIG. 2. Accordingly, by using the pipe connection unit 50 to be explained in FIG. 4, the pipes 18A, 18B illustrated in FIG. 1 can be respectively connected to the air operation valve 15, and the pipes 18C, 18D illustrated in FIG. 1 can be respectively connected to the air operation valve 16.

A Vickers hardness of the pipe joint 17 is set to 300, for example. Note that the Vickers hardness of the pipe joint 17 is preferably set to one between 250 and 400 and equal to or greater than the Vickers hardness of the front ring 52. Further, the tapered surface of each of the tapered parts 45b, 46b may also have a smooth part with a smoothed surface by being subjected to a burnishing machining. In the burnishing machining, a surface portion of a metal is subjected to a plastic deformation, so that it is possible to increase a hardness of the surface portion. In other words, by performing the burnishing machining, it is possible to smooth the tapered surfaces of the tapered parts 45b, 46b, and to make the hardness of the tapered surfaces of the tapered parts 45b, 46b to be higher than the hardness of the front ring 52 to be described in FIG. 4.

Figure 4:
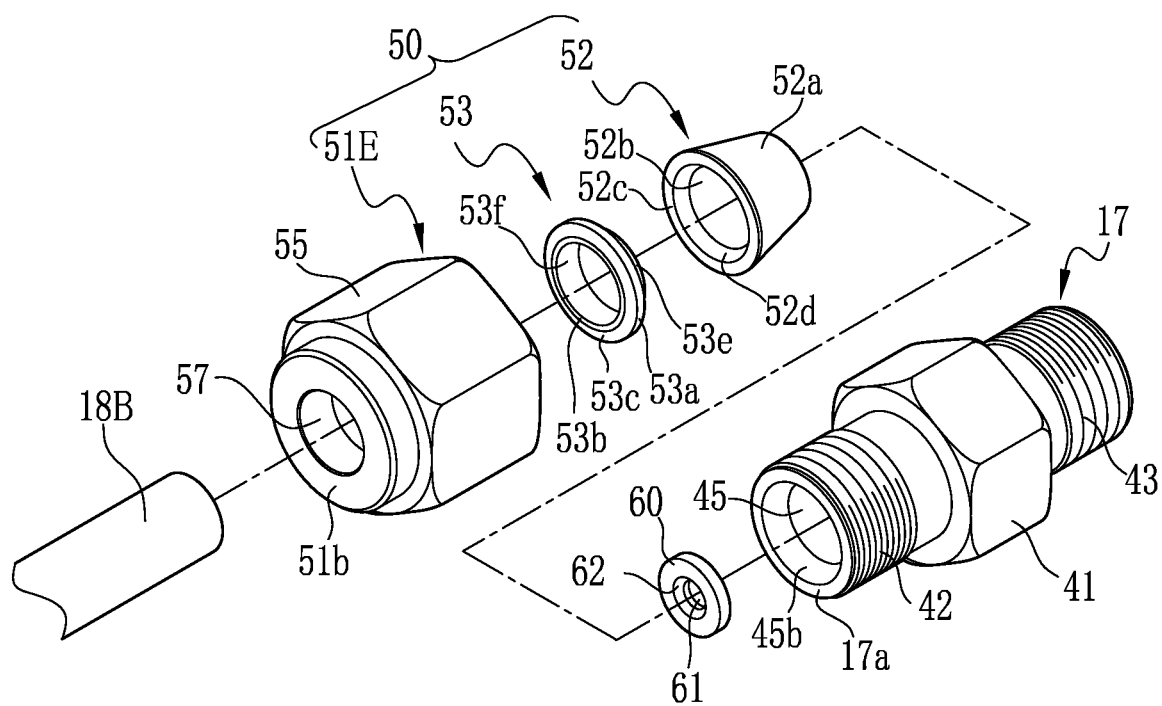
FIG. 4 is a perspective view of the pipe, the pipe joint, and a pipe connection unit illustrated in FIG. 1.
Figure 5:
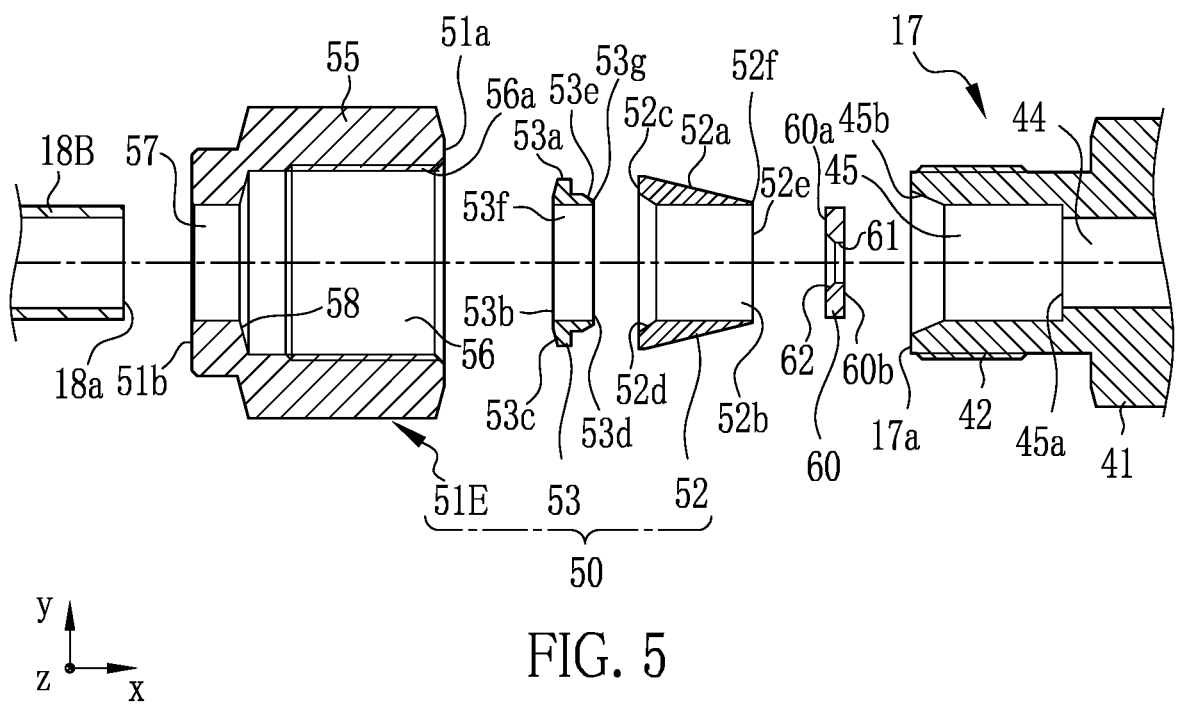
FIG. 5 is a sectional view of the pipe, the pipe joint, and the pipe connection unit illustrated in FIG. 4.

Each of FIG. 4 and FIG. 5 illustrates an example of the pipe 18B, the pipe joint 17, and the pipe connection unit 50 illustrated in FIG. 1. As illustrated in FIG. 4 and FIG. 5, the pipe connection unit 50 has a fastening member 51E, the front ring 52, and a back ring 53. The front ring 52 and the back ring 53 have a function of a fastening ring which fixes the pipe 18B in the pipe connection unit 50. The front ring 52 is one example of a first ring, and the back ring 53 is one example of a second ring.

Note that in the present embodiment, explanation will be made on an example in which the pipe 18B is connected to the pipe joint 17 together with an orifice plate 60 by using the pipe connection unit 50 having the front ring 52 and the back ring 53, but, it is also possible that the pipe 18B is connected to the pipe joint 17 by using the pipe connection unit 50 having only the front ring 52. In this case, an end face 52c of the front ring 52 illustrated in FIG. 5 has a shape corresponding to that of a tapered part 58 of the fastening member 51E, and a tapered part 52d is not formed on the front ring 52. That is, the end face 52c of the front ring 52 is formed to have a shape same as that of a tapered part 53c of the back ring 53.

The fastening member 51E is formed by using a metal material such as stainless steel, for example. The fastening member 51E has a nut part 55 provided on an outer peripheral surface and having a cross section of hexagonal column shape, an insertion part 56, a through hole 57, and the tapered part 58. The insertion part 56 opens to an end face 51a on one end side in an axial direction of the fastening member 51E and has a circular concave-shaped cross section, and an inner surface of the insertion part 56 has a female screw part 56a formed from the end face 51a to a predetermined depth. The through hole 57 has a cross section of circular shape, it is coaxial with the insertion part 56, and it opens to the insertion part 56 from an end face 51b on the other end side in the axial direction of the fastening member 51E. An inner diameter of the through hole 57 is slightly larger than the outer diameter of the pipe 18B, and is smaller than an inner diameter of the insertion part 56. Therefore, the tapered part 58 formed at a portion where the insertion part 56 and the through hole 57 are communicated, has a tapered surface in which an inner diameter is gradually reduced from the insertion part 56 toward the through hole 57. The through hole 57 is one example of a second through hole, the insertion part 56 is one example of a second concave part, and the tapered surface of the tapered part 58 is one example of a second contact surface.

The front ring 52 is formed by using a metal material such as stainless steel, for example, and has an annular shape. An outer periphery of the front ring 52 has a tapered part 52a in which an outer diameter is gradually reduced from an end face 52c on a side to be inserted into the insertion part 56 of the fastening member 51E toward an end face 52e on the opposite side to the end face 52c. A taper angle of the tapered part 52a of the front ring 52 is set to be smaller than the taper angle of the tapered part 45b provided to the pipe joint 17, for example. That is, the taper angle of the tapered part 52a of the front ring 52 is smaller than the taper angle of the tapered part 45b provided to the pipe joint 17 illustrated in FIG. 3B, the taper angle of the tapered part 31e of the joint part 31A and the taper angle of the tapered part 32e of the joint part 32A provided to the valve body 23 of the air operation valve 15 illustrated in FIG. 2. Further, a maximum outer diameter on the end face 52c side of the front ring 52 is set to be smaller than the inner diameter of the insertion part 56 of the fastening member 51E. For this reason, the front ring 52 can be disposed to be freely inserted through the insertion part 56. The Vickers hardness of the front ring 52 is set to 300, for example. Note that the Vickers hardness of the front ring 52 is preferably set to one between 250 and 350.

The front ring 52 has a through hole 52b which penetrates in an axial direction and has a cross section of circular shape. An inner diameter of the through hole 52b is set to be slightly larger than the outer diameter of the pipe 18B. On the end face 52c side of the through hole 52b, there is formed the tapered part 52d in which an inner diameter is gradually reduced from the end face 52c toward the inside of the through hole 52b. An outer diameter of the end face 52e of the tapered part 52a is larger than the inner diameter of the through hole 52b, so that an annular ridgeline 52f is formed on the end face 52e.

The back ring 53 is formed by using a metal material such as stainless steel, for example, and has an annular shape. A maximum outer diameter of an outer periphery 53a of the back ring 53 is set to be smaller than the inner diameter of the insertion part 56 of the fastening member 51E. For this reason, the back ring 53 can be disposed to be freely inserted through the insertion part 56. The back ring 53 has a through hole 53f which penetrates from an end face 53b to an end face 53d, and through which the pipe 18B is inserted. The outer periphery 53a of the back ring 53 has a tapered part 53c, on the end face 53b side being a side to be inserted into the insertion part 56, in which an outer diameter is gradually reduced from the outer periphery 53a toward the end face 53b. A taper angle of the tapered part 53c is equal to the taper angle of the tapered part 58 provided to the insertion part 56 of the fastening member 51E.

Further, the outer periphery 53a of the back ring 53 has, on the end face 53d side being the opposite side to the end face 53b, a tapered part 53e in which an outer diameter is gradually reduced toward the end face 53d. A taper angle of the tapered part 53e is smaller than the taper angle of the tapered part 52d provided to the front ring 52. An outer diameter of the end face 53d in the tapered part 53e of the back ring 53 is larger than an inner diameter of the through hole 53f, so that an annular ridgeline 53g is formed on the end face 53d. Note that the taper angle of the tapered part 53e of the back ring 53 is larger than the taper angle of the tapered part 52a of the front ring 52.

For example, the end face 53d side of the back ring 53 including the tapered part 53e is partially subjected to a carburizing treatment. That is, a region including the tapered part 53e which is brought into contact with the tapered part 52d of the front ring 52 when the fastening member 51E is screwed to the pipe joint 17 which will be described in FIG. 5 and FIG. 6, functions as a hardened part hardened by the carburizing treatment. The tapered part 53e is one example of a contact part which is brought into contact with the front ring 52. Here, the carburizing treatment includes a step of adding carbon to a surface layer of a metal, and a step of performing quenching and tempering on the metal to which carbon is added. Although a hardness of the surface layer to which carbon is added is increased by the carburizing treatment, corrosion resistance may be lowered. Note that when the corrosion resistance of the back ring 53 falls within an allowable range, it is also possible to perform the carburizing treatment on the entire back ring 53.

By the partial carburizing treatment, a Vickers hardness on the end face 53d side of the back ring 53 is set to, for example, 800 which is higher than a Vickers hardness (300, for example) on the end face 53b side. Note that the Vickers hardness on the end face 53d side of the back ring 53 is preferably set to one between 700 and 900. In summary, the hardness of the front ring 52 is higher than the hardness of the pipe 18B and equal to or less than the hardness of the pipe joint 17, and the hardness of the back ring 53 is higher than the hardness of the pipe joint 17.

When, as illustrated in FIG. 1, the air operation valves 15, 16 are mutually connected via the pipes 18B, 18C, and the pipe joint 17, and gas supplied from the pipe 18A is output from the pipe 18D via the air operation valves 15, 16, for example, an orifice plate 60 is disposed in the pipe joint 17 to which the pipe 18B is connected.

The orifice plate 60 is formed by using a metal material such as stainless steel, for example. The orifice plate 60 has a disk shape, and has an orifice 61 (hole) at a center portion thereof. To the orifice 61 on an end face 60a side of the orifice plate 60, there is provided a tapered part 62 in which an inner diameter is gradually reduced from the end face 60*a* toward the orifice 61. Note that it is also possible that the orifice plate 60 does not have the tapered part 62, and in this case, the orifice 61 penetrates between the end face 60*a* and an end face 60*b*. For example, the orifice plate 60 is subjected to an annealing treatment, and a hardness of the orifice plate 60 is set to be lower than a hardness of the stainless steel being the material. For example, a Vickers hardness of the orifice plate 60 is set to 100, which is lower than the Vickers hardness (200, for example) of the pipe 18B. Note that the Vickers hardness of the orifice plate 60 is preferably set to one between 80 and 200.

Figure 6A:
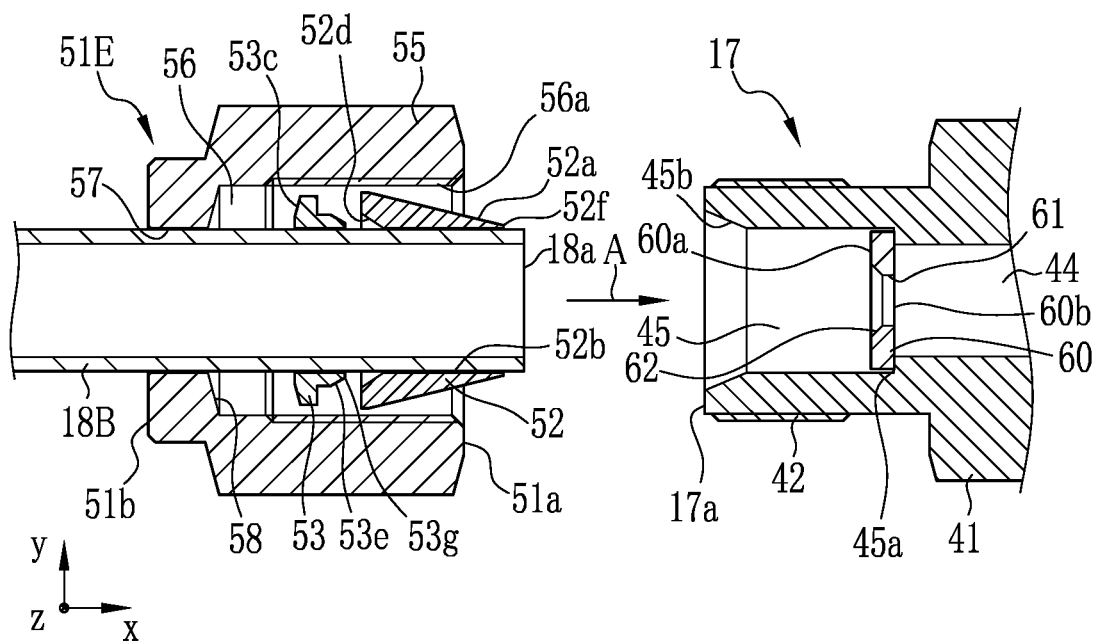
FIG. 6A is a sectional view illustrating a state where the pipe connection unit is installed to the pipe illustrated in FIG. 5.
Figure 6B:
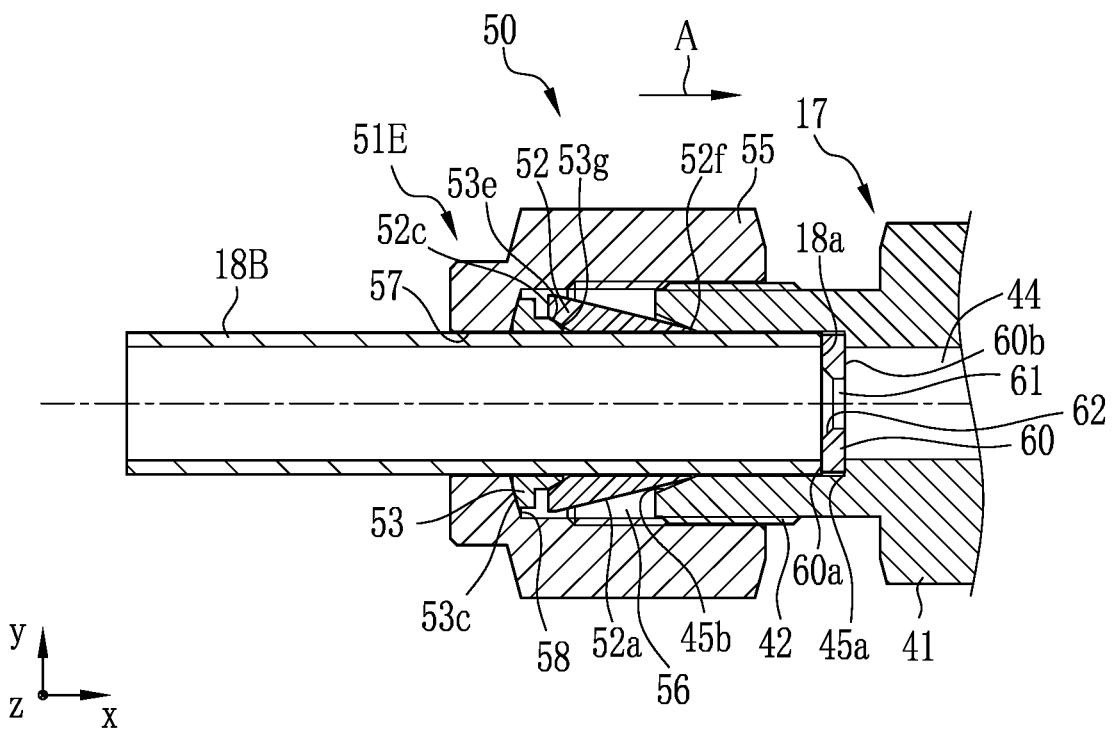
FIG. 6B is a sectional view illustrating a state where a female screw part of a fastening member illustrated in FIG. 6A is screwed to a male screw part of the pipe joint.

FIG. 6A and FIG. 6B illustrate an example of a method of connecting the pipe 18B to the pipe joint 17 to which the orifice plate 60 is installed, by using the pipe connection unit 50. First, the orifice plate 60 is inserted into the insertion part 45 of the pipe joint 17, and the end face 60*b* of the orifice plate 60 is brought into contact with the step surface 45*a*.

The pipe 18B is inserted through the through hole 57 of the fastening member 51E from the end face 51*b* side of the fastening member 51E, and a tip 18*a* of the pipe 18B protrudes from the end face 51*a* of the fastening member 51E. Next, the tapered part 58 of the fastening member 51E and the tapered part 53*c* of the back ring 53 are faced each other, and the pipe 18B is inserted through the through hole 53*f* of the back ring 53. Next, the tapered part 53*e* of the back ring 53 and the tapered part 52*d* of the front ring 52 are faced each other, and the pipe 18B is inserted through the through hole 52*b* of the front ring 52. Note that it is also possible that the pipe 18B which is inserted through the back ring 53 and the front ring 52 is inserted through the through hole 57 from the insertion part 56 side of the fastening member 51E.

Next, the tip 18*a* of the pipe 18B is inserted into the insertion part 45 of the pipe joint 17. When, during a movement of the tip 18*a* of the pipe 18B inside the insertion part 45 in a direction A, the ridgeline 52*f* is brought into contact with the tapered part 45*b* of the pipe joint 17, the movement of the front ring 52 in the direction A is regulated. In addition, when the ridgeline 53*g* provided to the end face 53*d* of the tapered part 53*e* of the back ring 53 is brought into contact with the tapered part 52*d* of the front ring 52, the movement of the back ring 53 in the direction A is regulated.

Subsequently, the pipe 18B is inserted into the insertion part 45 until when the tip 18*a* is brought into contact with the end face 60*a* of the orifice plate 60. The orifice plate 60 with which the tip 18*a* of the pipe 18B is brought into contact is in a state of being held between the tip 18*a* of the pipe 18B and the step surface 45*a* provided to the pipe joint 17. When the fastening member 51E is not brought into contact with the pipe joint 17, the fastening member 51E is moved in the direction A up to a position where the female screw part 56*a* can be screwed to the male screw part 42 of the pipe joint 17. In a state where the fastening member 51E is moved to the position where the female screw part 56*a* thereof can be screwed to the male screw part 42 of the pipe joint 17, the back ring 53 and the front ring 52 are housed inside the insertion part 56 of the fastening member 51E. In this state, each of the back ring 53 and the front ring 52 can move, in the insertion part 56, in the axial direction of the pipe 18B (in an x direction illustrated in FIG. 6A).

Next, when the nut part 55 of the fastening member 51E is tightened by using a tool or the like, the fastening member 51E rotates around the x direction indicated in FIG. 6A or FIG. 6B as a rotation axis, and the female screw part 56*a* of the fastening member 51E is screwed to the male screw part 42 of the pipe joint 17. The fastening member 51E is screwed to the pipe joint 17 by a predetermined number of rotations in which it is set that problems such as rotation of the pipe 18B and fall-off of the pipe 18B do not occur. Alternatively, the fastening member 51E is screwed to the pipe joint 17 until when a gap between the nut part 55 of the fastening member 51E and the nut part 41 of the pipe joint 17 becomes an interval in which it is set that the above-described problems do not occur.

By screwing the fastening member 51E to the pipe joint 17, the fastening member 51E moves in the direction A toward the pipe joint 17. Subsequently, as illustrated in FIG. 6B, in the process where the fastening member 51E is screwed to the pipe joint 17, the tapered part 58 of the fastening member 51E is brought into contact with the tapered surface of the tapered part 53*c* of the back ring 53. When the fastening member 51E is further screwed to the pipe joint 17, the tapered surface of the tapered part 58 of the fastening member 51E presses the tapered surface of the tapered part 53*e* of the back ring 53 in the direction A, and the back ring 53 moves in the direction A. After the tapered part 53*e* of the back ring 53 is brought into contact with the tapered part 52*d* of the front ring 52, the back ring 53 presses, with the ridgeline 53*g*, the tapered part 52*d* of the front ring 52, and the front ring 52 moves in the direction A together with the back ring 53 until when the ridgeline 52*f* of the front ring 52 is brought into contact with the tapered part 45*b* of the pipe joint 17.

Note that when the ridgeline 52*f* of the front ring 52 is already brought into contact with the tapered part 45*b* of the pipe joint 17, the front ring 52 pressed by the back ring 53 presses the tapered part 45*b* of the pipe joint 17 with the ridgeline 52*f*. When the fastening member 51E is further tightened by the tool, by a pressing force applied from the fastening member 51E to the pipe joint 17, the front ring 52 and the back ring 53 are subjected to a plastic deformation to bite into the pipe 18B, and then press the pipe 18B against the pipe joint 17 side to press the orifice plate 60 with the tip 18*a* of the pipe 18B, as will be described below.

First, the pressing force applied to the back ring 53 is dispersed into a pressing force in the direction A and a pressing force in an outer peripheral direction by the tapered part 53*e*. In a similar manner, the pressing force applied to the front ring 52 is dispersed into a pressing force in the direction A and a pressing force in an outer peripheral direction by the tapered part 52*a*. The taper angle of the tapered part 53*e* of the back ring 53 is larger than the taper angle of the tapered part 52*a* of the front ring 52. For this reason, the force by which the back ring 53 presses the front ring 52 in the direction A is larger than the force by which the front ring 52 presses the pipe joint 17 in the direction A. Further, the force by which the front ring 52 presses the tapered part 45*b* of the pipe joint 17 in the outer peripheral direction is larger than the force by which the back ring 53 presses the tapered part 52*d* of the front ring 52 in the outer peripheral direction.

As illustrated in FIG. 6B, a length in an axial length direction of the tapered part 53*e* of the back ring 53 is shorter than a length in an axial length direction of the tapered part 52*a* of the front ring 52, so that the tapered part 53*e* of the back ring 53 has rigidity higher than that of the tapered part 52*a* of the front ring 52. Besides, when the hardness of the tapered part 53*e* of the back ring 53 is increased by the carburizing treatment, the tapered part 53*e* is difficult to be subjected to the plastic deformation when compared to the tapered part 52*a* of the front ring 52.

For this reason, first, the tapered part 52*a* of the front ring 52 is subjected to the plastic deformation by a reaction force of pressing the tapered part 45*b* of the pipe joint 17 in the outer peripheral direction, and a contact state between the front ring 52 and the tapered part 45b changes from a state where they are brought into contact by the ridgeline 52f to a state where they are brought into contact by the tapered surface of the tapered part 52a. Accordingly, an annular tip portion of the front ring 52 (a portion in the vicinity of the ridgeline 52f) is deformed toward the pipe 18B by a reaction force of the pressing force with respect to the tapered part 45b, and the front ring 52 further moves in the direction A toward the pipe joint 17. Subsequently, a tip portion of the tapered part 52a enters a gap between the tapered part 45b and the pipe 18B. Further, since the hardness of the tapered part 52a is higher than the hardness of the pipe 18B, the tapered part 52a bites into the pipe 18B. The front ring 52 is fixed to the pipe 18B to be integrated with the pipe 18B. After the front ring 52 is integrated with the pipe 18B, the pipe 18B moves in the direction A as the front ring 52 moves in the direction A.

Consequently, the outer periphery of the pipe 18B and the tapered parts 52a, 45b are mutually brought into contact without gap, resulting in that airtightness of the flow path 44 is maintained. Here, since the hardness of the pipe joint 17 is equal to or greater than the hardness of the front ring 52, it is possible to make the pressing force applied from the tapered part 52a of the front ring 52 to the tapered part 45b of the pipe joint 17 efficiently act as a force of deforming the tapered part 52a toward the pipe 18B, without causing deformation of the tapered part 45b of the pipe joint 17. Besides, when the burnishing machining is performed on the tapered surface of the tapered part 45b, a surface of the tapered part 45b becomes smooth, and at the same time, the hardness of the tapered part 45b becomes high. Accordingly, the tip portion of the tapered part 52a of the front ring 52 is deformed so as to slide on the surface of the tapered part 45b, and thus it easily enters the gap between the tapered part 45b and the pipe 18B. As a result of this, the adhesion among the outer periphery of the pipe 18B and the tapered parts 52a, 45b can be further improved, which makes it possible to further improve the airtightness of the flow path 44.

Meanwhile, when the hardness of the pipe joint 17 is lower than the hardness of the front ring 52, there is a possibility that the tapered part 45b of the pipe joint 17 is deformed by the pressing force of the front ring 52. In this case, when compared to a case where the hardness of the pipe joint 17 is equal to or greater than the hardness of the front ring 52, it is not possible to make the pressing force applied to the tapered part 45b sufficiently act as the force of deforming the tip portion of the tapered part 52a toward the pipe 18B, resulting in that the adhesion among the outer periphery of the pipe 18B, the tapered part 52a, and the tapered part 45b is lowered.

As the movement amount of the front ring 52 in the direction A becomes small due to the plastic deformation of the tapered part 52a, the pressing force from the tapered part 53e of the back ring 53 to the front ring 52 becomes strong, and the tapered part 53e starts to be subjected to the plastic deformation. That is, a contact state between the back ring 53 and the tapered part 52d changes from a state where they are brought into contact by the ridgeline 53g to a state where they are brought into contact by the tapered surface of the tapered part 53e. Accordingly, an annular tip portion on the end face 53d side of the back ring 53 (a portion in the vicinity of the ridgeline 53g) is deformed toward the pipe 18B by a reaction force of the pressing force with respect to the tapered part 52d, and the back ring 53 further moves in the direction A toward the front ring 52. Subsequently, the tapered part 53e enters a gap between the tapered part 52d and the pipe 18B, and is brought into contact with the pipe 18B without gap in a state of pressing the whole circumference of the outer peripheral surface of the pipe 18B.

Further, since the hardness of the tapered part 53e is higher than the hardness of the pipe 18B, the tapered part 53e bites into the pipe 18B. The back ring 53 is fixed to the pipe 18B to be integrated with the pipe 18B. After the back ring 53 is integrated with the pipe 18B, the pipe 18B moves in the direction A as the back ring 53 and the front ring 52 move in the direction A. Note that when the tapered part 53e of the back ring 53 presses the tapered part 52d of the front ring 52, a force of pushing and expanding the tapered part 52d in the outer peripheral direction is generated, and a reaction force of the force of pushing and expanding the tapered part 52d acts as a force of making the tip portion of the tapered part 52a enter the gap between the tapered part 45b and the pipe 18B and bite into the pipe 18B.

When the front ring 52 and the back ring 53 are fixed to the pipe 18B, and then the fastening member 51E is further tightened by the tool, the most part of the pressing force from the fastening member 51E to the back ring 53 acts as a pressing force from the tip 18a of the pipe 18B to the orifice plate 60. Accordingly, the orifice plate 60 is subjected to a plastic deformation, and the tip 18a of the pipe 18B, the orifice plate 60, and the step surface 45a of the pipe joint 17 are mutually brought into contact without gap. Therefore, the airtightness of the flow path 44 can be maintained by not only the front ring 52 but also the orifice plate 60. That is, the airtightness of the flow path 44 can be maintained at two places of the front ring 52 and the orifice plate 60, and when compared to a case where the airtightness is maintained at one place, it is possible to improve reliability of the pipe connection structure. Further, only by tightening the fastening member 51E to the pipe joint 17, it is possible to seal the flow path at two places of the front ring 52 and the orifice plate 60. As a result of this, it is possible to improve workability of installation of the pipe 18B and the orifice plate 60 to the pipe joint 17, and exchange of the pipe 18B and the orifice plate 60 installed to the pipe joint 17, while improving the reliability of the pipe connection structure. Note that the orifice plate 60 has a function as a gasket, so that it is also called as art orifice gasket.

Besides, since the orifice plate 60 maintains the airtightness, it is possible to prevent fluid flowing through the flow path 44 from entering a gap between the outer periphery on the tip 18a side of the pipe 18B and the insertion part 45 of the pipe joint 17. Therefore, it is possible to prevent the outer periphery on the tip 18a side of the pipe 18B, an inner wall of the insertion part 45 of the pipe joint 17, and the tip of the tapered part 52a of the front ring 52 from being contaminated or corroded by the fluid such as gas. As a result of this, it is possible to prevent the adhesion among the outer periphery of the pipe 18B and the tapered parts 52a, 45b from being lowered due to the corrosion and the like, and to prevent the reduction in the reliability of the pipe connection structure.

Note that when the hardness of the orifice plate 60 is set to be lower than the hardness of the pipe 18B and the pipe joint 17, the orifice plate 60 pressed by the tip 18a of the pipe 18B is likely to be subjected to the plastic deformation. For this reason, it is possible to further improve the adhesion among the tip 18a of the pipe 18B, the orifice plate 60, and the step surface 45a of the pipe joint 17, which enables to further improve the airtightness of the flow path 44.

In a manner as described above, it is possible to prevent occurrence of leakage of fluid such as gas leakage at a connecting portion between the pipe joint 17 and the pipe 18B. Further, since the pipe 18B is fixed by the back ring 53 and the front ring 52 confined in the insertion part 56 of the fastening member 51E, it is possible to prevent a problem in which the pipe 18B rotates relative to the pipe joint 17 and a problem in which the pipe 18B falls off of the pipe joint 17.

Further, in a state where the pipe 18B is connected to the pipe joint 17 by using the pipe connection unit 50, the orifice plate 60 is held inside the pipe joint 17 in a state of being pressed against the flow path 44 side by the tip 18a of the pipe 18B. Therefore, in the fluid control unit 100, a flow rate of the gas supplied from the air operation valve 15 illustrated in FIG. 2 can be adjusted by the orifice 61 provided to the orifice plate 60, and the gas can be stably supplied to the air operation valve 16 on the downstream side without changing the flow rate of the gas after being passed through the orifice 61 almost at all.

A method of connecting the pipe 18C illustrated in FIG. 1 to the pipe joint 17 is similar to the procedure using the pipe connection unit 50 described in FIG. 6A and FIG. 6B, except that the orifice plate 60 is not attached to the inside of a not-illustrated insertion part 45 provided on the right side of FIG. 1 in the pipe joint 17. In this case, the pipe 18B illustrated in FIG. 6A and FIG. 68 is replaced with the pipe 18C. Further, a method of connecting the pipe 18A or the pipe 18B illustrated in FIG. 1 to the air operation valve 15 is similar to the procedure using the pipe connection unit 50 described in FIG. 6A and FIG. 6B except that the orifice plate 60 is not attached to the inside of the insertion part 31c or the insertion part 32c of the air operation valve 15 illustrated in FIG. 2. Furthermore, a method of connecting the pipe 18C or the pipe 18D illustrated in FIG. 1 to the air operation valve 16 is similar to the procedure of connecting the pipe 18A or the pipe 18B to the air operation valve 15 except that the orifice plate 60 is not attached to the air operation valve 16.

Here, as the gas which is supplied from the fluid control unit to a processing chamber and the like of a semiconductor manufacturing equipment, a pyrophoric gas which causes ignition in the air and which has toxicity and corrosiveness, is sometimes used. In recent years, it has been demanded to increase a flow rate and a pressure of the gas supplied in the fluid control unit. The higher the flow rate and the pressure of the gas, the higher a probability at which the flow path of the pipe and the like in the fluid control unit is damaged by a foreign material mixed in the gas. Further, the higher the flow rate and the pressure of the gas, the higher a probability at which the pipe and the orifice plate of the fluid control unit are corroded by the gas.

Further, when a foreign material is mixed in the gas to be supplied, there is a possibility that a surface of a wafer processed by the semiconductor manufacturing equipment is damaged, which causes short-circuit of a circuit formed on the surface of the wafer. There is a case where a foreign material which flows in the fluid control unit together with gas is adhered to the pipe and the like, and then peeled by the flow of the gas to be flowed again in the fluid control unit. For this reason, in the fluid control unit, it is required to regularly perform maintenance work of exchanging the pipe, the orifice plate, or the like for preventing the corrosion of the pipe or the orifice plate or preventing the adhesion of the foreign material to the pipe, for example, to secure the reliability with respect to the fluid control unit.

For example, when the pipe 18B connected to the pipe joint 17 by the pipe connection unit 50 illustrated in FIG. 4 is exchanged, the fastening member 51E is first loosened by using the tool to release the connection between the fastening member 51E and the pipe joint 17, and the pipe 18B which is in use and to which the front ring 52 and the back ring 53 are fixed is detached from the pipe joint 17 together with the fastening member 51E. Next, after the pipe 18B to which the front ring 52 and the back ring 53 are fixed is pulled out of the fastening member 51E, a new pipe 18B is connected to the pipe joint 17 by using new front ring 52 and back ring 53.

Further, since the orifice plate 60 is disposed in the insertion part 45 without being fixed to the pipe joint 17, when exchanging the orifice plate 60, it is possible to detach the orifice plate 60 which is in use from the insertion part 45 by detaching the pipe 18B together with the pipe connection unit 50. Subsequently, after a new orifice plate 60 is inserted into the insertion part 45 of the pipe joint 17, a new pipe 18B is connected to the pipe joint 17 by using the new pipe 18B, a new front ring 52, and a new back ring 53, through a procedure similar to that described in FIG. 6A and FIG. 6B.

As described above, when performing the maintenance work of exchanging the pipe 18B or the orifice plate 60, it is only required to loosen the fastening member 51E, detach the pipe 18B together with the pipe connection unit 50 (the fastening member 51E, the front ring 52, and the back ring 53), and install the new pipe 18B by using the new front ring 52 and back ring 53. For this reason, it is possible to improve the workability during the maintenance and suppress a cost in the maintenance work. Therefore, it is possible to maintain the reliability of the fluid control unit 100 without increasing the maintenance cost.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A pipe connection structure, comprising:
   a joint comprising:
     a first through hole configured for fluid flow there through,
     a first insertion part in communication with the first through hole and into which a pipe is inserted,
     a first contact surface provided at an open end of the first insertion part, and
     an installation surface provided in the first insertion part at an open end of the first through hole;
   an orifice plate disposed in the joint so as to abut the installation surface, the orifice plate including:
     a first end face that faces away from the installation surface and a second end face on an opposite side of the orifice plate that is disposed so as to abut the installation surface, and
     an orifice including:
       a tapered portion on a side of the first end face of the orifice plate, the tapered portion of the orifice having an inner diameter that decreases in a direction from the first end face towards the installation surface, and
       a cylindrical orifice portion having a constant inner diameter that extends from the tapered portion to the second end face of the orifice plate;
   a fastening member comprising:

a second through hole through which the pipe is inserted,
a second insertion part in communication with the second through hole,
a second contact surface that is provided in the second insertion part at an open end of the second through hole, and
a screw part which is screwed to a screw part comprised by the joint,
a first ring through which the pipe is inserted and which is disposed in contact with the first contact surface, the first ring having a hardness that is higher than a hardness of the pipe and equal to or less than a hardness of the joint; and
a second ring through which the pipe is inserted and which is disposed in contact with the second contact surface, the second ring having a hardness that is higher than the hardness of the joint;
wherein the pipe connection structure is configured to be assembled to the pipe by:
screwing of the screw part of the fastening member to the screw part of the joint, and pressing the first ring and the second ring held between the first contact surface and the second contact surface against the first contact surface such that the first ring and the second ring bite into the pipe to fix the first ring and the second ring to the pipe, and
making the pipe fixed by the first ring and the second ring move to a joint side by a pressing force that presses the orifice plate against the installation surface with a tip of the pipe.

2. The pipe connection structure according to claim 1, wherein:
a Vickers hardness of the second ring is set between 700 and 900;
a Vickers hardness of the first ring is set between 250 and 350;
a Vickers hardness of the joint is set between 250 and 400 and equal to or greater than the Vickers hardness of the first ring; and
a Vickers hardness of the pipe is set between 150 and 250 and lower than the Vickers hardness of the first ring.

3. The pipe connection structure according to claim 2, wherein
a hardness of the orifice plate is lower than the hardness of the pipe.

4. The pipe connection structure according to claim 3, wherein
a Vickers hardness of the orifice plate is set between 80 and 200 and lower than the hardness of the pipe.

5. The pipe connection structure according to claim 1, wherein
the second ring includes a hardened part hardened by a carburizing treatment, the hardened part being disposed in a region including a contact part that is in contact with the first ring when the fastening member is screwed to the joint.

6. The pipe connection structure according to claim 1, wherein:
the first contact surface of the joint includes a smooth part smoothed by a burnishing machining; and
a hardness of the smooth part is higher than the hardness of the first ring.

7. The pipe connection structure according to claim 1, wherein the orifice plate has a thickness in a direction from the first end face to the second end face that is smaller than a dimension of the orifice plate in a direction orthogonal to the thickness.

8. The pipe connection structure according to claim 1, wherein the installation surface extends in a direction orthogonal to a longitudinal axis of the joint.

9. The pipe connection structure according to claim 1, wherein the second contact surface of the fastening member is tapered.

10. A pipe connection unit for connecting a pipe to a joint including a first through hole, a first insertion part in communication with the first through hole and into which the pipe is inserted, a first contact surface provided at an open end of the first insertion part, and an installation surface provided in the first insertion part at an open end of the first through hole, the pipe connection unit comprising:
an orifice plate configured to be installed in the joint so as to abut the installation surface, the orifice plate including:
a first end face that is configured to face away from the installation surface and a second end face on an opposite side of the orifice plate that is disposed so as to abut the installation surface, and
an orifice including:
a tapered portion on a side of the first end face of the orifice plate, the tapered portion of the orifice having an inner diameter that decreases in a direction from the first end face towards the second end face, and
a cylindrical orifice portion having a constant inner diameter that extends from the tapered portion to the second end face of the orifice plate;
a fastening member comprising:
a second through hole through which the pipe is inserted,
a second insertion part in communication with the second through hole,
a second contact surface that is provided in the second insertion part at an open end of the second through hole, and
a screw part which is configured to be screwed to a screw part comprised by the joint;
a first ring through which the pipe is inserted and which is configured to be disposed in contact with the first contact surface, the first ring having a hardness that is higher than a hardness of the pipe and equal to or less than a hardness of the joint; and
a second ring through which the pipe is inserted and which is disposed in contact with the second contact surface, the second ring having a hardness that is higher than the hardness of the joint;
wherein the pipe connection unit is configured to be assembled with the joint and the pipe by:
screwing of the screw part of the fastening member to the screw part of the joint, and pressing the first ring and the second ring held between the first contact surface and the second contact surface against the first contact surface such that the first ring and the second ring bite into the pipe to fix the first ring and the second ring to the pipe, and
making the pipe fixed by the first ring and the second ring move to a joint side by a pressing force that presses the orifice plate against the installation surface with a tip of the pipe.

11. A method for connecting a pipe to a joint via a pipe connection unit, the joint including:
a first through hole through which fluid can flow, a first insertion part in communication with the first through hole and having a first contact surface provided at an open end of the first insertion part, and a screw part, the pipe connection unit including:
   a fastening member including:
      a second through hole through which the pipe is inserted,
      a second insertion part in communication with the second through hole,
      a second contact surface provided in the second insertion part at an open end of the second through hole, and
      a screw part;
   a first ring having a hardness that is higher than a hardness of the pipe and equal to or less than a hardness of the joint; and
   a second ring having a hardness that is higher than the hardness of the joint, the second ring being configured to be disposed in contact with the second contact surface when the fastening member and the joint are assembled to the pipe;

the method comprising:
   disposing an orifice plate on an installation surface provided in the first insertion part at an open end of the first through hole, the orifice plate including:
      a first end face that faces away from the installation surface and a second end face on an opposite side of the orifice plate that is disposed so as to abut the installation surface, and
      an orifice including:
         a tapered portion on a side of the first end face of the orifice plate, the tapered portion of the orifice having an inner diameter that decreases in a direction from the first end face towards the installation surface, and
         a cylindrical orifice portion having a constant inner diameter that extends from the tapered portion to the second end face of the orifice plate;
   inserting a tip of the pipe that is inserted through the fastening member, the second ring, and the first ring into the first insertion part of the joint by:
      screwing the screw part of the fastening member to the screw part of the joint, and pressing the first ring and the second ring held between the first contact surface and the second contact surface against the first contact surface; and
      making the first ring and the second ring bite into the pipe to fix the first ring and the second ring to the pipe, and making the pipe fixed by the first ring and the second ring move to a joint side by a pressing force that presses the orifice plate against the installation surface with the tip of the pipe.

12. The method according to claim 11, wherein:

before installing the pipe to the joint,
   the fastening member screwed to the joint is loosened;
   the fastening member is detached from the joint together with another pipe which is in use and is to be replaced by the pipe and into which the first ring and the second ring are bitten; and another orifice plate which is in use and is to be replaced by the orifice plate is detached from the first insertion part.

* * * * *